(12) United States Patent
Soukhojak et al.

(10) Patent No.: US 8,899,025 B2
(45) Date of Patent: Dec. 2, 2014

(54) DEVICES, SYSTEMS AND METHODS FOR REDUCING AN EMISSION FROM A COMBUSTION REACTION

(75) Inventors: Andrey N. Soukhojak, Midland, MI (US); David H. Bank, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 345 days.

(21) Appl. No.: 13/367,426

(22) Filed: Feb. 7, 2012

(65) Prior Publication Data
US 2012/0198821 A1    Aug. 9, 2012

Related U.S. Application Data

(60) Provisional application No. 61/440,541, filed on Feb. 8, 2011.

(51) Int. Cl.
| F01N 3/00 | (2006.01) |
| F01N 3/28 | (2006.01) |
| F01N 3/20 | (2006.01) |
| F28D 9/00 | (2006.01) |
| F28D 20/02 | (2006.01) |
| F01N 3/035 | (2006.01) |

(52) U.S. Cl.
CPC ............ *F01N 3/2882* (2013.01); *F01N 3/2006* (2013.01); *F01N 3/2053* (2013.01); *F01N 3/2093* (2013.01); *F28D 9/0012* (2013.01); *F28D 20/023* (2013.01); *F01N 3/035* (2013.01); *F01N 2240/10* (2013.01); *F01N 2240/36* (2013.01); *F01N 2410/02* (2013.01); *F01N 2510/06* (2013.01); *Y02T 10/26* (2013.01); *F28F 2265/26* (2013.01); *Y02E 60/145* (2013.01)
USPC .............................................. 60/287; 60/274

(58) Field of Classification Search
CPC ... F01N 3/2006; F01N 3/2882; F01N 3/2053; F01N 3/2093; F28D 9/0012; F28D 20/023
USPC .................................................... 60/274, 287
See application file for complete search history.

(56) References Cited

U.S. PATENT DOCUMENTS

| 5,101,801 A | * | 4/1992 | Schatz .......................... 123/556 |
| 5,130,099 A | | 7/1992 | Schatz |
| 5,698,483 A | | 12/1997 | Ong et al. |
| 5,939,354 A | | 8/1999 | Golden |
| 6,953,544 B2 | | 10/2005 | Jones et al. |
| 2003/0070427 A1 | * | 4/2003 | Banzhaf et al. ................. 60/320 |

(Continued)

FOREIGN PATENT DOCUMENTS

| DE | 102004052107 A1 | * | 5/2006 |
| GB | 2254014 A | * | 9/1992 |

(Continued)

OTHER PUBLICATIONS

English translation of DE 102004052107 (May 2006).*

(Continued)

*Primary Examiner* — Thomas Denion
*Assistant Examiner* — Jason Shanske

(57) ABSTRACT

The invention is directed at systems and process for reducing or eliminating the emissions of one or more undesirable substances. The systems include a heat storage device an emission reduction device, one or more valves, and one or more exit points.

19 Claims, 8 Drawing Sheets

(56) References Cited

U.S. PATENT DOCUMENTS

| | | | |
|---|---|---|---|
| 2007/0180816 A1* | 8/2007 | Masuda et al. | 60/274 |
| 2008/0017573 A1 | 1/2008 | Pyzik et al. | |
| 2008/0148700 A1 | 6/2008 | Ziebarth | |
| 2009/0094963 A1* | 4/2009 | Mizoguchi et al. | 60/286 |
| 2009/0211726 A1 | 8/2009 | Bank et al. | |
| 2009/0250189 A1 | 10/2009 | Soukhojak et al. | |
| 2010/0003172 A1 | 1/2010 | Li et al. | |

FOREIGN PATENT DOCUMENTS

| | | |
|---|---|---|
| WO | 9942360 | 8/1999 |
| WO | 0010913 | 3/2000 |
| WO | 2010015940 A2 | 2/2010 |
| WO | 2011094371 A2 | 8/2011 |

OTHER PUBLICATIONS

Gaiser, Gerd, "A New Design Concept for Metallic Diesel Particulate Filter Substrates", SAE International World Congress 2007, Paper No. 2007-01-0655, Published Apr. 16, 2007 (DOI: 10.4271/2007-01-655).

Sharma, Atul, et al., Renewable & Sustainable Energy Reviews, 13 (2009) 318-345, 2007 Elsevier Ltd., Review on thermal energy storage with phase change materials and applications, India.

Zalba, Belen, et al., Applied Thermal Engineering 23 (2003) 251-283, Review on thermal energy storage with phase change: materials, heat transfer analysis and applications, Pergamon, 2002 Elsevier Ltd., Spain.

Schulz, Udo, Bosch GmbH Robert, Jan. 21, 2010, Abstract for DE102008040451, "Particle filter for filtering exhaust gas of diesel internal-combustion engine, has porous filter wall separating outlet channel from inlet channel, and latent heat storage material arranged in outlet channel in region of inlet side".

Hosoya, Hideo, et al., Mazda Motor, Abstract for JP2008291777, Dec. 4, 2008, "Engine Exhaust Heat Recovery Device and Its Method".

Yoda, Koichi, et al., Abstract for JP2010001779A, Toyota Motor Corp., Jan. 7, 2010, "Exhaust Emission Control Device for Internal Combustion Engine".

Gaiser, Gerd, Abstract for DE102004052107, Eberspaecher J Gmbh & Co., May 4, 2006, "Operation of an exhaust system for a motor vehicle, comprises loading an internal-combustion engine by a latent heat reservoir and preheating the engine by an oxidation catalyst from the reservoir".

* cited by examiner

By-Pass of Heat Storage Device

Charging Mode

Charging Mode

Charging Mode

DEVICES, SYSTEMS AND METHODS FOR REDUCING AN EMISSION FROM A COMBUSTION REACTION

CLAIM OF PRIORITY

The present application claims the benefit of U.S. Provisional Patent Application No. 61/440,541 (filed on Feb. 8, 2011) and PCT Patent Application No. PCT/US12/23935 (filed on Feb. 6, 2012) which are both incorporated by reference in their entirety for all purposes.

FIELD OF THE INVENTION

The present invention relates to systems and methods for treating emissions from a combustion reaction so that the quantity of one or more of the substances in the emissions is reduced when the emissions pass through an emissions reduction device, such as a catalytic converter. The present invention is particularly useful when the combustion reaction has been stopped or reduced for a period of time.

BACKGROUND OF THE INVENTION

Industry in general has been actively seeking a novel approach to reduce and/or eliminate harmful emissions (e.g., gases and/or particulate matter that can harm the environment, humans, or both) from combustion reactions. For example, many vehicles that employ an internal combustion engine employ an emission reduction device, such as a catalytic converter, for reducing and/or eliminating one or more harmful emissions. Whether employed in an internal combustion engine or otherwise, many of these emission reduction devices are ineffective or less effective at low temperatures. When starting a combustion process, there may be a delay, or warm-up period, between the time that the emissions begin to pass through the emission reduction device and the time that the emission reduction device has attained a temperature in which it can effectively reduce the emissions as intended. During the warm-up period, there will be increased harmful emissions. Thus, it is beneficial to reduce (i.e., shorten) or even eliminate the duration of the warm-up period.

There have been various approaches for reducing the emissions during the warm-up of the emission reduction device. Examples of devices, systems, and methods for reducing harmful emissions during a warm-up period are given in PCT Application Publication No. WO 2010/015940 (by Toi et al. and published on Feb. 11, 2010), German Patent Application Publication No. DE 102008040451 A1 (by Schulz et al. published on Jan. 21, 2010), Japan Patent Application No. JP2010-001779A (by Koichi et al. and published on Jan. 7, 2010), Japan Patent Application Publication Number JP2008-291777A (by Hideo et al. and published on Dec. 4, 2008), and Gerd Gaiser and Patrick Mucha, "A New Design Concept for Metallic Diesel Particulate Filter Substrates", SAE International World Congress 2007, Paper Number 2007-01-0655, Published Apr. 16, 2007 (DOI: 10.4271/2007-01-0655), each of which is incorporated herein by reference in its entirety. Some approaches have focused on reducing the warm-up time by transferring more of the heat from the combustion emissions to an emission reduction device using a loop heat pipe, or by adding a phase change material to an emission reduction device, or by employing a heat transfer fluid to transfer heat from a heat storage device to an emission reduction device. Other approaches require an additional emission reduction device that does not require a warm-up time.

These approaches all require one or more of the following: one or more additional fluid loops, an additional emission reduction device, or an emission reduction device that contains a phase change material. The addition of a phase change material to an emission reduction device may limit the use of the emission reduction device to reduce the risk of overheating the phase change material. The addition of a phase change material to an emission reduction device may increase the warm-up time of the emission reduction device when the combustion reaction is inactive for a sufficiently long time that the phase material loses most of its stored heat to the environment. The addition of an additional fluid loop and/or an additional emission reduction device may result in increased weight and cost. For these reasons, there continues to be a need for additional systems, devices and approaches for reducing the emissions from a warm-up period. For example, there is a need for an emission reduction system that offers more flexibility in thermal management by directing the available heat to the most beneficial recipient (e.g., at different moments in time), an emission reduction systems employing less catalyst (such as a system that includes a heat storage device that is substantially free of, or even entirely free of an emission reduction catalyst), an emission reduction system that is capable of operating in different modes (such as an operating mode that includes flowing a fluid through a heat storage device and later through an emission reduction device, an operating mode that includes flowing a fluid through an emission reduction device and later through a heat storage device, an operating mode that includes flow of a fluid through an emission reduction device and by-passing a heat storage device, an operating mode that includes circulating a fluid through a closed loop that includes the heat storage device and the emission reduction device, or any combination thereof).

SUMMARY OF THE INVENTION

One aspect of the invention is a process for reducing the amount of one or more undesirable substances (e.g., chemicals, particles, or both) in a flow of a fluid from the discharge of an emission source, wherein the process includes a step of charging a heat storage device by flowing at least a portion of a fluid through a fluid passage of an emission reduction device and later through a fluid passage of the heat storage device, and a subsequent step of warming-up the emission reduction device by flowing a fluid through the fluid passage of the heat storage device and later through the fluid passage of the emission reduction device.

Another aspect of the invention is a system for reducing the amount of one or more undesirable chemicals in a flow of a fluid from the discharge of an emission source, the system comprising an emission reduction device capable of reducing a quantity of the undesirable chemicals; a heat storage device including a thermal energy storage material; one or more valves for controlling the flow of the fluid; and one or more exit points; wherein the system includes a sufficient number of valves which are positioned with respect to the emission reduction device, the heat storage device, and the exit, so that the system is capable of operating in at least two modes including a warm-up mode and a charging mode. During the warm-up mode, the emission reduction device, the heat storage device, and at least one of the valves are in fluid communication with each other and at least some of the flow of the fluid passes through the heat storage device prior to passing through the emission reduction device, wherein thermal energy is removed from the heat storage device. During the charging mode, the emission source, the emission reduction device, the heat storage device, at least one exit point, and at least one valve are in fluid communication with each other; and the heat storage device receives heat from the flow of the fluid from the discharge of the emission source.

Another aspect of the invention is a system for reducing the amount of one or more undesirable chemicals in a flow of a fluid from the discharge of an emission source, the system comprising an emission reduction device capable of reducing a quantity of the undesirable chemicals; a heat storage device including a thermal energy storage material; one or more valves for controlling the flow of the fluid; and one or more exit points; wherein the system is capable of operating in at least two modes including:

i) a warm-up mode, wherein the emission reduction device, the heat storage device, and at least one of the one or more valves are in fluid communication with each other and at least some of the flow of the fluid passes through the heat storage device prior to passing through the emission reduction device, (e.g., wherein the temperature of the emission reduction device is increased at least partially from heat from the heat storage device and carried by the fluid), wherein the temperature of the thermal energy storage material is decreased, at least some of the thermal energy storage material undergoes a liquid to solid phase transition, or both; and ii) a charging mode wherein the emission reduction device, the heat storage device, at least one of the one or more exit points, and at least one of the one or more valves are in fluid communication with each other, and the temperature of the thermal energy storage material is increased, at least some of the thermal energy storage material undergoes a solid to liquid phase transition, or both, wherein a first portion of the flow of the fluid passes through the heat storage device prior to passing through the emission reduction device, (e.g., and is discharged from the one or more exit points), wherein the amount of the one or more undesirable chemicals in the first portion is first reduced in the emission reduction device, and a second portion of the flow of the fluid passes through the emission reduction device without passing through the heat storage device.

Another aspect of the invention is a process for reducing the emissions from an emission fluid using a heat storage device, such as a heat storage device according to the teaching herein.

Another aspect of the invention is a process employing a emission reduction system according to the teachings herein. The process may include a charging mode, a warm-up mode, a by-pass mode, or any combination thereof.

The systems and process of the present invention advantageously may be employed for reducing emissions of carbon monoxide, emissions of hydrocarbons, emissions of nitrogen oxides, particulate matter or any combination thereof. The systems and process of the present invention may be employed for reducing emissions using reduced quantities of catalyst (e.g., the heat storage device may be substantially free of, or even entirely free of catalyst).

BRIEF DESCRIPTION OF THE FIGURES

The present invention is further described in the detailed description which follows, in reference to the noted plurality of drawings by way of non-limiting examples of embodiments of the present invention, in which like reference numerals represent similar parts throughout the several views of the drawings, and wherein:

FIGS. 8A, 8B, and 8C illustrate features of various warm-up process modes for operating a system. FIG. 8D illustrates features of a charging process mode of operating a system. FIG. 8E illustrates features of a by-pass mode of operating a system.

DETAILED DESCRIPTION OF THE PRESENT INVENTION

Figure 1:
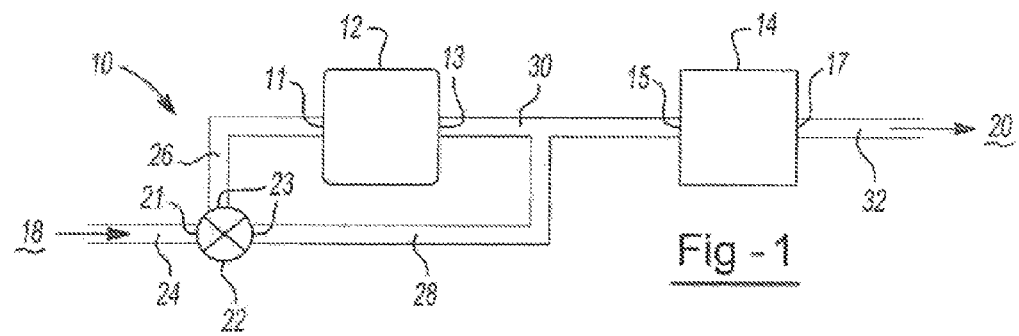
FIG. 1 is a drawing illustrating features of an emission reduction system according to the teachings herein including one or more valves 22 for controlling the flow of a fluid.

In the following detailed description, the specific embodiments of the present invention are described in connection with its preferred embodiments. However, to the extent that the following description is specific to a particular embodiment or a particular use of the present techniques, it is intended to be illustrative only and merely provides a concise description of the exemplary embodiments. Accordingly, the invention is not limited to the specific embodiments described below, but rather; the invention includes all alternatives, modifications, and equivalents falling within the true scope of the appended claims.

As will be seen from the teachings herein, the present invention provides articles, devices, systems, and process for storing thermal energy, preferably from a combustion reaction, into a heat storage device, and then providing at least some of the stored heat to an emission reduction device. Heat is preferably provided from the heat storage device to the emission reduction device prior to or during a warm-up period so that the duration of the warm-up period is reduced (i.e., shortened) or eliminated. The emission reduction systems according to the teachings herein are capable of being in fluid communication with an emission fluid from an emission source and may be advantageously employed to reduce the amount of one or more undesirable substances (such as a chemicals, a particle, or both) from the emission fluid.

The system generally includes one or more emission reduction devices, one or more heat storage devices, one and one or more exit points. The emission reduction systems preferably includes one or more valves that allow the system to operate in different modes. The emission reduction system may be capable of operating in one or any combination (e.g., two or more) of the following modes: a warm-up mode in which heat from a heat storage device is transferred to an emission reduction device; a charging mode in which heat from a fluid emission is transferred to a heat storage device; or a by-pass mode in which some or all of a fluid emission by-passes a heat storage device and flows through an emission reduction device.

The warm-up mode may advantageously be employed to increase the temperature of the emission reduction device so that the emission reduction device is more effective in reducing the amount of one or more undesirable chemicals in the emission fluid. During the warm-up mode, the temperature of the heat storage device may decrease (e.g., the temperature of the thermal energy storage material in the heat storage device may decrease). Preferably, during the warm-up mode, a portion of, or even all of the thermal energy storage material (TESM) in the heat storage device undergoes a liquid to solid phase transition.

The charging mode may advantageously be employed for transferring heat from an emission fluid to the heat storage device so that the heat can be stored in the heat storage device. During the charging mode, the temperature of the TESM in the heat storage device may be increased, some or all of the TESM may undergo a solid to liquid phase transition, or both. Preferably, during the charging mode, the concentration of TESM that is a liquid is increased. During the charging mode, it may be desirable for the emission fluid to pass through an emission reduction device prior to passing through the heat storage device so that the emission fluid has a sufficiently high temperature to enable the reduction of one or more undesirable chemicals as it passes through the emission reduction device.

The by-pass mode may advantageously be employed when the temperature of the TESM reaches an upper limit temperature so that the heat storage device and/or the TESM is not overheated. In particular, it has been determined that heating of the TESM above the upper temperature limit, such as by cycling for 1000 or more cycles, may result in a reduction of the heat storage capacity of the heat storage device. During the by-pass mode, the flow of the emission fluid through the heat storage device may be reduced or eliminated. By way of example, during the by-pass mode, the flow of the emission fluid through the heat storage device may be controlled using one or more valves for maintaining the temperature of the heat storage device and/or the TESM within a predetermined range, such as between a first temperature equal to or above a solid to liquid phase transition temperature of the TESM and a second higher temperature that is at or below the upper temperature limit of the TESM. As such, the by-pass mode may be employed for maintaining the TESM in a liquid state, for avoiding overheating the TESM, or both.

The fluid emission source may be any emission source, such as an emission source that results in the flow of a fluid containing one or more undesirable chemicals. The one or more undesirable chemicals may include one or more chemicals that are provided to the emission source (e.g., one or more reactants), one or more reaction products, or any combination thereof. The emission source may be from the flow of a fluid resulting from a combustion reaction. Without limitation, exemplary emission sources that may employ a combustion reaction include an oil heater, a natural gas heater, a gas turbine, a boiler, an incinerator, or an internal combustion engine. The emission source may be stationary (such as in a home, building, factory, power plant, and the like), or it may be mobile. Emission sources that are mobile include emission sources on a means of transport such as a vehicle, a plane, a trains, a watercraft, and the like. The emission source may react one or more hydrocarbon reactants to produce energy, preferably by a combustion reaction with oxygen. Any hydrocarbon reactant may be employed. The hydrocarbon reactant may be a solid, a liquid, a gas, or any combination thereof. The hydrocarbon reactant may be a fossil fuel, such as oil, natural gas, coal, gasoline, diesel fuel, and the like. Particularly preferred fossil fuels include fossil fuels that have been refined, such as diesel fuel and gasoline. Another particularly preferred fossil fuel is natural gas. The hydrocarbon reactant may be a bio-fuel, derived from one or more biological organisms, such as from plants, algae, animals, or any combination thereof. Other hydrocarbon reactants that may be used include synthetic fuels, such as synthetic fuels derived from organic or inorganic reagents.

As described hereinbefore, the emission reduction device may be employed to reduce the amount of one or more undesirable substances, such as one or more undesirable chemicals, undesirable particulate matter, or both. As used herein, an undesirable chemical may be any chemical other than water, nitrogen gas, and oxygen. For example, an undesirable chemical may be any chemical other than water, nitrogen gas, oxygen, and carbon dioxide. The undesirable chemicals may be chemical that are by-products from the emission source or entrained in the emission fluid. The undesirable chemicals may be chemicals that are toxic or pose other health risks, chemicals that pose a threat to the environment, or both. Without limitation, the one or more undesirable chemicals may include, consist essentially of, or consist entirely of hydrocarbons, carbon monoxide, nitrogen oxide, carbon containing particles (e.g., soot particles), or any combination thereof.

The heat storage device may be any device capable of storing heat so that the heat may be used to heat an emission reduction device, such as when the emission reduction device has a temperature below the lower limit operating temperature of the emission reduction device. The heat storage device may include one or more TESMs. The amount of TESM in the heat storage device may be such that the heat storage device is capable of storing a sufficient amount of heat to increase the temperature of the emission reduction device from an ambient temperature to a temperature above its lower limit operating temperature, or sufficiently close to the lower limit operating temperature. For example, the heat storage device may be capable of storing a sufficient amount of heat to increase the temperature of the emission reduction device from about 0° C. or less to about 110° C. or more. As described hereinafter, particularly preferred TESMs for use in the heat storage device have one or more solid to liquid phase transitions at a temperature above the lower limit operating temperature of the emission reduction device.

The heat storage device may include one or more orifices for allowing the fluid from the emission source to flow into the heat storage device and one or more orifices for allowing the fluid from the emission source to flow out of the heat, storage device. It will be appreciated according to the teachings herein that the heat storage device may be used in a system that operates in a plurality of modes including a first operating mode in which a first orifice of the heat storage device is used for flowing at least a portion of the fluid into the heat storage device and a second operating mode in which the first orifice is used for flowing the fluid out of the heat storage device. Similarly, the heat storage device may have a second orifice for flowing at least a portion of the fluid out of the heat storage device during the first mode, for flowing at least a portion of the fluid into the heat storage device during the second mode, or both. According to the teachings herein, the heat storage device may be employed in a system in which the first orifice of the heat storage device allows the fluid only to flow into the heat storage device, the second orifice of the heat storage device allows the fluid only to flow out of the heat storage device, or both.

The heat storage device may include one or more fluid passages for flowing the fluid through the heat storage device. The one or more fluid passages may provide a fluid connection between the one or more orifices for flowing the fluid into the heat storage device and the one or more orifices for flowing the fluid out of the heat storage device. The one or more fluid passages may be employed for flowing a fluid from the heat storage device to the emission reduction device while operating the system in a warm-up mode. Preferably, the same one or more fluid passages are also employed for flowing some or all of the emission fluid through the heat storage device while operating the system in the charging mode.

The heat storage device may include a catalyst located in the fluid passage of the heat storage device, for instance on one or more surfaces of the fluid passage and/or on one or more supports in the fluid passage. If employed in the heat storage device, the type and amount of catalyst may be selected so that the heat storage device is capable of reducing the amount of the one or more undesirable chemicals in the emission fluid while operating the system in a warm-up mode (such as during a cold-start). If employed, the catalyst in the heat storage device may be capable of reducing the amount of the one or more undesirable chemicals in the fluid (e.g., when the heat storage device has a temperature at which the undesirable chemicals undergo a reaction, such as a temperature of about 100° C. or more, about 115° C. or more, about 125° C. or more, or about 150° C. or more. If employed, the catalyst in the heat storage system may be the same as, or different from the catalyst employed in the emission reduction device. Preferably, the heat storage device includes a catalyst having a minimum operating temperature (e.g., a minimum temperature at which the catalyst is effective in reducing one or more undesirable chemicals) than the minimum operating temperature of the catalyst in the emission reduction device.

According to the teachings herein, in embodiments of the invention the heat storage device may be substantially or entirely free of a catalyst for reducing the amount of the one or more undesirable chemicals. As such, the amount of an undesirable chemical as a fluid enters the heat storage device may be substantially the same as the amount of the undesirable chemical as the fluid exits the heat storage device.

A particularly preferred heat storage device for use in the present invention is a heat storage described in paragraphs 008-117 and paragraphs 132-141 of International Patent Application No. PCT/US11/22662 (filed by Soukhojak et al. on Jan. 27, 2011), incorporated herein by reference. For example, the heat storage device may include one or more articles (such as a stack of articles) having one or any combination of the following features (e.g., all of the following features): the articles may comprise a capsular structure having one or more sealed spaces, the sealed spades may encapsulate one or more TESMs; the capsular structure may have one or more fluid passages which are sufficiently large to allow a heat transfer fluid to flow through the one or more fluid passages; or when a heat transfer fluid contacts the capsular structure the TESM may be physically isolated from the heat transfer fluid.

The heat storage device may be sufficiently insulated so that the heat storage device, when heated to about 300° C., and exposed to an ambient temperature of about 0° C., decreases in temperature at a generally low rate, such as a rate of about 1° C./min or less, about 0.2° C./min or less, about 0.1° C. or less, or about 0.05° C. or less. When the heat storage device is heated to about 300° C. and then exposed to an ambient temperature of about 25° C., it may be sufficient insulated so that a temperature of at least about 100° C. is maintained in the heat storage device (e.g., without flow of a fluid through the device) for about 2 hours or more, preferably about 4 hours or more, more preferably about 10 hours or more, and most preferably about 24 hours or more. Preferably the heat storage device is substantially thermally isolated when fluid is not flowing through the fluid passages. For example, when the fluid is not flowing through the heat storage device, the system may be free of a thermal conduction path between the TESM in the heat storage device and the emission reduction device.

For example, the TESM may be encapsulated between two metal layers that are sealingly attached to form one or more isolated capsules. Without limitation, the heat storage device may employ a capsule or an arrangement of capsules (e.g., a blister pack or stack of blister packs) described in U.S. Patent Application Publication No. US 2009/0250189 A1, published on Oct. 8, 2009, incorporated herein by reference.

The heat storage device preferably has a sufficient amount of thermal energy so that the heat storage device can release to a fluid (e.g., to an emission fluid) about 0.02 MJ or more of heat, preferably about 0.08 MJ or more of heat, and more preferably about 0.14 MJ or more of heat, and most preferably about 0.20 MJ or more of heat when the heat storage device is cooled from about 300° to about 80° C.

Without limitation, suitable TESMs for the heat storage device include materials that are capable of exhibiting a relatively high density of thermal energy as sensible heat, latent heat, or preferably both. The TESM is preferably compatible with the operating temperature range of the heat storage device. For example the TESM is preferably a solid at the lower operating temperature of the heat storage device, is at least partially a liquid (e.g., entirely a liquid) at the maximum operating temperature of the heat storage device, does not significantly degrade or decompose at the maximum operating temperature of the device, or any combination thereof. The TESM preferably does not significantly degrade or decompose when heated to the maximum operating temperature of the device for about 1,000 hours or more, or even for about 10,000 hours or more.

The TESM may be a phase change material having a solid to liquid transition temperature. The solid to liquid transition temperature of the TESM may be a liquidus temperature, a melting temperature, or a eutectic temperature. The solid to liquid transition temperature should be sufficiently high so that when the TESM is at least partially or even substantially entirely in a liquid state enough energy is stored to heat the emission reduction device. The solid to liquid transition temperature should be sufficiently low so that the heat transfer fluid, the one or more objects to be heated, or both, are not heated to a temperature at which it may degrade. As such the desired temperature of the solid to liquid transition temperature may depend on the object to be heated and the method of transferring the heat. For example, in an application that transfers the stored heat to an engine (e.g., an internal combustion engine) using a glycol/water heat transfer fluid, the maximum solid to liquid transition temperature may be the temperature at which the heat transfer fluid degrades. As another example, the stored heat may be transferred to an electrochemical cell of a battery using a heat transfer fluid where the heat transfer fluid has a high degradation temperature, and the maximum solid to liquid temperature may be determined by the temperature at which the electrochemical cell degrades or otherwise fails. The solid to liquid transition temperature may be any temperature above ambient (or above 40°) which is suitable for the system which the TESMs are utilized. Preferably, the solid to liquid transition temperature is greater than about 100° C., more preferably greater than about 120° C., more preferably greater than about 150° C., even more preferably greater than about 180° C., and most preferably greater than about 190° C. The TESM may have a solid to liquid transition temperature less than about 400° C., preferably less than about 350° C., more preferably less than about 290° C., even more preferably less than about 250° C., and most preferably less than about 200° C. It will be appreciated that depending on the application, the solid to liquid transition temperature may be from about 80° C. to about 150° C., from about 125° C. to about 250° C. from about 100° C. to about 200° C. from about 150° C. to about 250° C., from about 175° C. to about 400° C., from about 200° C. to about 375° C., from about 225° C. to about 400° C., or from about 200° C. to about 300° C.

For some applications, such as transportation related applications, it may desirable for the thermal energy material to efficiently store energy in a small space. As such, the TESM may have a high heat of fusion density (expressed in units of megajoules per liter), defined by the product of the heat of fusion (expressed in megajoules per kilogram) and the density (measured at about 25° C. and expressed in units of kilograms per liter). The TESM may have a heat of fusion density greater than about 0.1 MJ/liter, preferably greater than about 0.2 MJ/liter, more preferably greater than about 0.4 MJ/liter, and most preferably greater than about 0.6 MJ/liter. Typically, the TESM has a heat of fusion density less than about 5 MJ/liter. However, TESMs having a higher heat of fusion density may also be employed.

For some applications, such as transportation related applications, it may be desirable for the TESM to be light weight. For example, the TESM may have a density (measured at about 25° C.) less than about 5 g/cm3, preferably less than about 4 g/cm3, more preferably less than about 3.5 g/cm3, and most preferably less than about 3 g/cm3. The lower limit on density is practicality. The TESM may have a density (measured at about 25° C.) greater than about 0.6 g/cm3, preferably greater than about 1.2 g/cm3 and more preferably greater than about 1.7 g/cm3.

The sealed spaces may contain any art known TESM. Examples of TESMs that may be employed in the thermal heat storage device include the materials described in Atul Sharma, V. V. Tyagi, C. R. Chen, D. Buddhi, "Review on thermal energy storage with phase change materials and applications", Renewable and Sustainable Energy Reviews 13 (2009) 318-345, and in Belen Zalba, Jose Ma Mann, Luisa F. Cabeza, Harald Mehling, "Review on thermal energy storage with phase change: materials, heat transfer analysis and applications", Applied Thermal Engineering 23 (2003) 251-283, both incorporated herein by reference in their entirety. Other examples of suitable TESMs that may be employed in the heat transfer device include the TESMs described in U.S. Patent Application Publication Nos. US 200910250189 A1 (published on Oct. 8, 2009) and US 2009/0211726 A1 (published on Aug. 27, 2009), both incorporated herein by reference.

The TESM may include (or may even consist essentially of or consist of) at least one first metal containing material, and more preferably a combination of the at least one first metal containing material and at least one second metal containing material. The first metal containing material, the second metal containing material, or both, may be a substantially pure metal, an alloy such as one including a substantially pure metal and one or more additional alloying ingredients (e.g., one or more other metals), an intermetallic, a metal compound (e.g., a salt, an oxide or otherwise), or any combination thereof. One preferred approach is to employ one or more metal containing materials as part of a metal compound; a more preferred approach is to employ a mixture of at least two metal compounds. By way of example, a suitable metal compound may be selected from oxides, hydroxides, compounds including nitrogen and oxygen (e.g., nitrates, nitrites or both), halides, or any combination thereof. It is possible that ternary, quaternary or other multiple component material systems may be employed also. The TESMs herein may be mixtures of two or more materials that exhibit a eutectic.

The TESM may include lithium cations, potassium cations, sodium cations, or any combination thereof. The TESM may include lithium cations at a concentration from about 20% to about 80 mole %, preferably from about 30% to about 70% based on the total moles of cations in the TESM. The TESM may include lithium nitrate at a concentration from about 20 mole % to about 80 mole % lithium nitrate, based on the total moles of salt in the TESM. The TESM may includes from about 30 mole % to about 70 mole % lithium nitrate and from about 30 mole % to about 70 mole % sodium nitrate. The TESM may include lithium nitrate and sodium nitrate at a total concentration greater than 90 wt. % (e.g., greater than about 95 wt. %) based on the total weight of the TESM. The TESM may include at least one first metal compound that includes a nitrate ion, a nitrite ion, or both; at least one second metal containing material including at least one second metal compound; and optionally including water, wherein the water concentration if any is present is less than about 10 wt %. The TESM may be a eutectic composition including lithium nitrate, sodium nitrate, lithium nitrite, sodium nitrite, or any combination thereof.

The emission reduction device may be capable of reducing the amount of at least one or more of the harmful chemicals in a fluid that passes through the emission reduction device. Preferably, the emission reduction device is capable of reducing the amount of nitrogen oxides, hydrocarbons, carbon monoxide, particulate matter, or any combination thereof. More preferably, the emission reduction device is capable of reducing the amount of nitrogen oxides, hydrocarbon, carbon monoxide, or any combination thereof. Even more preferably, the emission reduction device is capable of reducing the amount of carbon monoxide and the amount of hydrocarbons in a fluid that passes through the emission reduction device. Most preferably, the emission reduction device is capable of reducing the amount of carbon monoxide, the amount of hydrocarbons, and the amount of nitrogen oxides in a fluid that passes through the emission reduction device. The emission reduction device may be capable of reacting (e.g., catalytically reacting) nitrogen oxides, such as to form nitrogen gas, oxygen gas, or preferably both. The emission reduction device may be capable of reacting (e.g., catalytically reacting) a hydrocarbon in a combustion reaction (i.e., a reaction with oxygen) that produces, at least carbon dioxide and water. The emission reduction device may be capable of reacting (e.g., catalytically reacting) carbon monoxide, such as in a reaction that produces at least carbon dioxide.

The emission reduction device may include one or more orifices for flowing the fluid into the device and one or more orifices for flowing the fluid out of the device. The emission reduction device may include one or more passages containing a catalyst capable of catalytically reacting with one or more harmful chemicals. The emission reduction device may include one or more catalyst supports for supporting the catalyst, such as a catalyst support that is porous, ceramic, or both. Exemplary catalysts and catalyst supports which may be employed include those described in U.S. Pat. No. 6,953,544 B2 column 2, line 59 to column 8, line 9, incorporated herein by reference. The catalyst may include a noble metal, a base metal, or any combination thereof.

The catalyst may be any suitable catalyst, such as those known in the art. In particular, the catalyst may be any one of the following preferred embodiments or combinations of them.

A first preferred catalyst is directly bound-metal catalysts, such as noble metals, base metals and combinations thereof. Examples of noble metal catalysts include platinum, rhodium, palladium, ruthenium, rhenium, silver and alloys thereof. Examples of base metal catalysts include copper, chromium, iron, cobalt, nickel, zinc, manganese, vanadium, titanium, scandium and combinations thereof. The metal catalyst, preferably, is in the form of a metal, but may be present as an inorganic compound, such as an oxide, nitride and carbide, or as a defect structure within the ceramic grains of the porous catalyst support. The metal may be applied by any suitable technique, such as those known in the art. For example, the metal catalyst may be applied by chemical vapor deposition.

A second preferred catalyst coating is one that is incorporated into the lattice structure of the ceramic grains of a porous catalyst support. For example, an element may be cerium, zirconium, lanthanum, magnesium, calcium, a metal element described in the previous paragraph or combinations thereof. These elements may be incorporated in any suitable manner, such as those known in the art and by methods described later.

A third preferred catalyst is a combination of ceramic particles having metal deposited thereon. These are typically referred to as wash coats. Generally, wash coats consist of micrometer sized ceramic particles, such as zeolite, aluminosilicate, silica, ceria, zirconia, barium oxide, barium carbonate and alumina particles that have metal deposited thereon. The metal may be any previously described for directly deposited metal. A particularly preferred wash coat catalyst coating is one comprised of alumina particles having a noble metal thereon. It is understood that the wash coat may be comprised of more than one metal oxide, such as alumina having, oxides of at least one of zirconium, barium, lanthanum, magnesium and cerium.

A fourth preferred catalyst is a perovskite-type catalyst comprising a metal oxide composition, such as those described by Golden in U.S. Pat. No. 5,939,354.

A fifth preferred catalyst is one that is formed by and deposited on the catalyst support by calcining at a temperature of from about 300° C. to about 3000° C., a composition that comprises (a) an aqueous salt, solution containing at least one metal salt and (b) an amphiphilic ethylene oxide containing copolymer, wherein the copolymer has an average molecular weight of greater than 400, an ethylene oxide content of 5 to 90 percent and an HLB of between −15 and 15, as described by Gruenbauer, et al., PCT patent application Ser. No. 99/18809. In addition, the catalyst may also be one such as described by U.S. Pat. No. 5,698,483 and PCT patent application Ser. No. 99/03627.

More preferred catalysts include one or more atoms selected from the group consisting of platinum, palladium, rhodium, cerium, iron, manganese, nickel, copper, and any combination thereof. Most preferred catalysts include, consist essentially of, or consist entirely of platinum, palladium, rhodium, or any combination thereof.

The emission reduction system (e.g., the emission reduction device) may include one or more art known diesel particulate filters. For example, the emission reduction system or the emission reduction device may include a diesel particulate filter described in Patent Application Publication Nos. US 2008/0017573, 2008/0148700, and 2010/0003172, incorporated herein by reference in their entirety. Preferred diesel particulate filters are ceramic. Preferred diesel particulate filters are honeycomb structured. The filter may comprise silicon carbide, cordierite, an acicular mullite. The filter may optionally contain one or more catalysts.

Particularly preferred emission reduction devices include catalytic converters or scrubbers.

The one or more passages of the emission reduction device preferably is employed for passing an emission fluid through the emission reduction device while operating the system in a by-pass mode, while operating the system in a charging mode, or both. The same one or more passages of the emission reduction device preferably is employed while operating the system in a warm-up mode for heating the emission reduction device using a fluid (which according to the teachings herein may be an emission fluid or a different fluid).

The system may have one or more additional components such as one or more valves, one or more fans or blowers, one or more exit points, one or more mufflers, one or more controllers, one or more devices or components for measuring temperature (e.g., at one or more locations in a system according to the teachings herein), one or more devices or components for measuring fluid flow rate (e.g., at one or more locations in a system according to the teachings herein), one or more devices or components for measuring fluid pressure (e.g., at one or more locations in a system according to the teachings herein), or any combination thereof. For example, the system may include one or more thermocouples or other means of measuring a temperature of a component selected from the group consisting of a heat storage device, a fluid (such as an emission fluid), an emission reduction device, and any combination thereof.

The system may include one or more connectors for providing a fluid communication between two components of the system. Suitable connectors have two or more openings and a passageway between the two openings for flowing a fluid between the two openings. Preferred connectors have solid surfaces except for the openings, have exactly two openings. Most preferred connectors have solid surfaces except for the openings and have exactly two openings for the passageway. A connector may be used for connecting two or more components. For example, a connector may connect two or more of the components selected from an emission source, a heat storage device, an emission reduction device, a valve, an exit point, a blower or fan, or a muffler. When in use, a connector between two components may be used to flow a portion of, the majority of, or the entirety of a fluid from a first component to a second component. It will be appreciated that a connector may be of any form or shape and may have subcomponents, including subcomponents which may also be suitable as connectors, A preferred connector includes, or consists essentially of a pipe or tube.

The system may include one or more valves for controlling the flow of the fluid (e.g., the emissions fluid) between two or more of the following components, an emissions source, a heat storage device, an emissions reduction device, an exit point, a muffler, or any combination thereof. According to the teachings herein, the system may advantageously include one or more valves capable of changing the order in which the fluid flows through two or more components. For example, the one or more valves may be capable of changing the order in which the fluid flows through the heat storage device and the emission reduction device. In particular, the one or more valves may provide a first configuration in which the fluid flows through the heat storage device prior to flowing through the emission reduction device and a second configuration in which the fluid flows through the emission reduction device prior to flowing through the heat storage device.

The system should have a sufficient number of valves so that the system can operate in a plurality of modes. For example, the system may be capable of operating in two or more, or three or more modes with the selection of the valves. The selection of the valves includes the number of valves, the positioning of the valves (e.g., with respect to the other components), the type of valves, and the like. Preferably, the system has a sufficient number of valves so that the system can operate in a warm-up mode and a charging mode. More preferably, the system has a sufficient number of valves so that the system is capable of operating in a warm-up mode, a charging mode, and a by-pass mode.

The valves may have multiple positions. A valve may have multiple discrete positions. According to the teachings herein, valves having one or more ranges of continuously variable position may also be employed. Each valve, independently or dependently, may have 2 or more positions. Preferred valve have 2, 3, or 4 positions. However valves having more positions may also be used. When the valve is moved from one position to another position, an inlet to the valve may change, an outlet from the valve may change, a flow path may be partially or entirely blocked, a flow path may be partially or entirely opened, or any combination thereof.

According to the teachings herein, the system, may advantageously include one or more valves capable of diverting the flow of the fluid so that some or all of the flow by-passes the heat storage device. For example, the one or more valves may provide a configuration (e.g., set of positions or settings) in which some or all of the fluid passes through the heat storage device while all of the fluid passes through the emission reduction device and a different configuration in which the fluid passes the emission reduction device and does not pass through the heat storage device. As another example, the one or more valves provide a configuration in which essentially all, or all of the fluid pass through both the heat storage device and the emission reduction device, and the one or more valves provide a different configuration in which at least a portion, or even all of the fluid does not pass through the heat storage device.

The system for reducing one or more emissions may include one or more systems or devices for flowing or circulating a fluid between the heat storage device and the emission reduction device to that heat from the heat storage device is provided to the emission reduction device. For example, a system or device for flowing or circulating a fluid between the heat storage device and the emission reduction device may be employed when the emissions source is not providing an emissions fluid. Examples of systems or devices for flowing or circulating a fluid include a fan, a blower, a vacuum, an injector and the like. The blower, fan, vacuum, or injector may be employed while the system is operating in a warm-up mode prior to the operation of an emission source. The blower, fan, vacuum, or injector may be employed to increase the temperature of the emission reduction source, preferably so that the temperature of the emission reduction is above its lower limit operating temperature. The system or device for flowing or circulating a fluid may be used to flow a fluid from the passage of the heat storage device that is used to flow the emission fluid through the heat storage device while operating in a charging mode and to a passage of the emission reduction device that is used to flow the emission fluid through the emission reduction device during the charging mode. As such, the need for any separate closed loop (such as a permanent closed loop) and necessary heat transfer fluid for transferring heat from the heat storage device to the emission reduction device may advantageously be eliminated.

During the warm-up mode, one or more valves may be employed (e.g., by setting the valve to a discrete position or by adjusting a valve having a continuous range of settings) for creating a closed loop path including the heat storage device having a first temperature, the emission reduction device having a second temperature, and the blower, fan, vacuum, or injector all in fluid communication, wherein the blower, fan, vacuum, or injector circulates a fluid between the heat storage device having and the emission reduction device when the first temperature is higher than the second temperature, when the second temperature is below the lower limit operating temperature of the emission reduction device. Such a warm-up mode may be used when the first temperature is above the lower limit operating temperature of the emission reduction device, or any combination thereof. Instead of creating a closed loop path, the one or more valves may be employed in the warm-up mode to allow a fan or blower to flow a fluid from a point which is used as an exit point for the emission fluid during the charging mode, later through the heat storage device, and later through the emission reduction device.

The system may include one or more exit points. The exit point may be used during one or more modes of operation to allow the emission fluid to exit the system. For example, the exit point may be an exhaust pipe that allows the emission fluid to enter the environment. As such, it will be appreciated that there may be an interest in reducing or eliminating one or more harmful chemicals from the emission fluid prior to passing an exit point.

The system may include a controller, such as a controller that controls the mode of operating the system, such as according to the teachings herein. A controller may control one or more valves so that the flow of a fluid in the system is controlled. A controller may monitor a fluid flow rate in one or more locations in the system. A controller may monitor a fluid pressure in one or more locations in the system. A controller may monitor one or more temperatures of the system, compare a temperature of the system to a predetermined value, compare a temperature of the system to a different temperature of the system, or any combination thereof. For example, the controller may control the system so that a fluid flows through the heat storage device and later through the emission reduction device when the temperature of the emission reduction device is below a predetermined lower temperature limit, when the temperature of the heat storage device is greater than the temperature of the emission reduction device, or preferably both. The controller may control the system so that at least a portion of a fluid flows through the emission reduction device and by-passes the heat storage device when the temperature of the heat storage device is greater than a predetermined upper temperature limit. The controller may control the system so that some or all of a fluid (such as an emission fluid) flows through the heat storage device when the temperature of the heat storage device is below a predetermined lower temperature limit (for example, when the fluid, the emission reduction device, or both has a temperature greater than the temperature of the heat storage device). The controller may also control the operation of a fan, blower, or vacuum, such as during a warm-up mode for heating the emission reduction device, preferably prior to operating an emission source. The controller may function by controlling one or more flows so that the available heat is provided to the device or devices that can benefit from the heat. The system may have flexibility in its thermal management, and the controller may provide the control for this thermal management, such as by monitoring one or more temperatures and controlling one or more valves.

With reference to FIG. 1, the emission reduction system 10 may include one or more heat storage devices 12, one or more emission reduction devices, e.g. 14, and one or more valves 22 that are in thermal communication with one or more emission sources 18 and one or more exit points 20. The emission reduction system 10 may be arranged so that a single valve 22 has an inlet 21 connected to an emission source pipe 24 that provides the emission fluid to the system and a plurality of outlets 23, 23 connected to the transfer pipe 26 and the by-pass pipe 28. The transfer pipe 26 may be connected to a first orifice 11 (e.g., an inlet) of the heat storage device 12. The by-pass pipe 28 may be connected directly or indirectly to a second orifice 13 (e.g., an outlet) of the heat storage device 12, a first orifice 15 (e.g., an inlet) of the emission reduction device, or preferably both. The system may include an exit pipe 32, such as an exit pipe connected to a second orifice 17 (e.g., an outlet) of the emission reduction device 14 so that the emission fluid may flow to an exit point 20. The system may be operated in a warm-up mode (e.g., when the temperature of the emission fluid in the emission source pipe and/or the temperature of the emission reduction device is lower than the temperature of the heat storage device), by setting the valve 22 to a position so that essentially all of, or entirely all of the emission fluid passes through the heat storage device prior to passing through the emission reduction device (i.e., the emission fluid flows primarily, or entirely from source pipe 24 to transfer pipe 26). The system may be operated in a charging mode (e.g., when the temperature of the emission fluid is greater than the temperature of the heat storage device) by setting the valve 22 to a position so that at least a portion of the emission fluid passes through the heat storage device 12. The system may be operated in a by-pass mode (e.g., when the temperature of the emission fluid is greater than the temperature of the heat storage device and the TESM in the heat storage device is in a liquid state) by setting the valve 22 to a position so that at least a portion, or even all of the of the emission fluid by-passes the heat storage device 12 by flowing from emission source pipe 24 through the valve 22, and to the by-pass pipe 28. When operating the system in the by-pass mode, the flow of the emission fluid through the heat storage device is reduced relative to the flow when operating the system in the charging mode.

Figure 2:
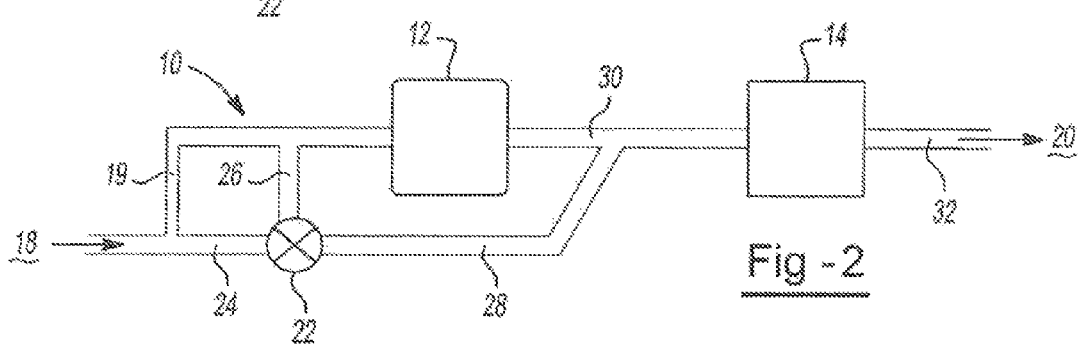
FIG. 2 is a drawing illustrating features of an emission reduction system including a bleed pipe for flowing a fluid through towards a heat storage device 12.

The emission reduction system may include one or any combination of the features illustrated in FIG. 2. The system may include a bleed pipe 19 that permits a flow of a portion of the emission fluid through the heat storage device 12. For example, the bleed pipe 19 may allow a portion of the emission fluid to flow through the heat storage device 12 even when a valve is set to only allow a connection between the source pipe 24 and the by-pass pipe 28. The amount of the emission fluid that flows through the bleed pipe 19 may be sufficient to substantially maintain the temperature of the heat storage device 12 when the TESM is in a liquid state. The amount of the emission fluid that flows through the bleed pipe 19 preferably is sufficiently low so that the heat storage device 12 is not overheated (e.g., so that the TESM does not degrade).

Figure 3:
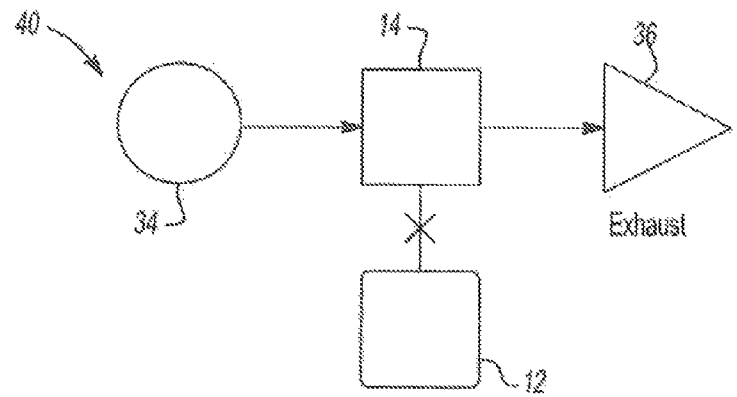
FIG. 3 is a flow diagram illustrating features of a by-pass process mode 40 for by-passing a heat storage device.

The emission reduction system may be capable in operating in a by-pass mode, such as the by-pass mode illustrated in FIG. 3. The by-pass mode 40 may be characterized by a process including a step of flowing at least a portion of, or even all of the emission fluid from an emission source 34 through the emission reduction device 14 to an exhaust point 36 without passing through the heat storage device 12. For example, substantially all of the emission fluid may by-pass the heat storage device 12.

Figure 4A:
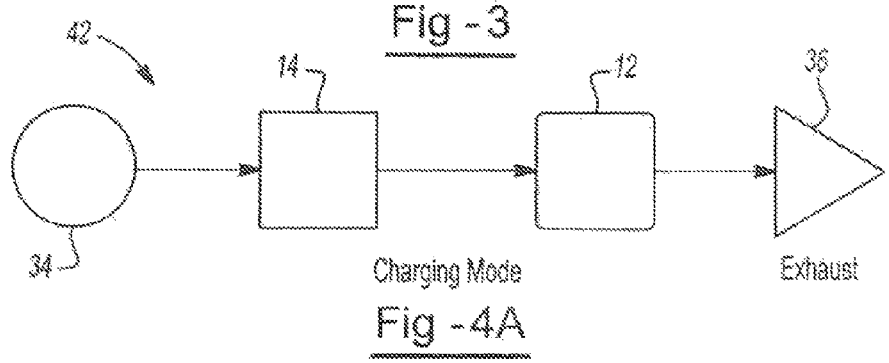
FIGS. 4A, 4B, and 4C are flow diagrams illustrating features of a charging process mode 42 for heating a heat storage device 12 with heat from an emission fluid.
Figure 4B:
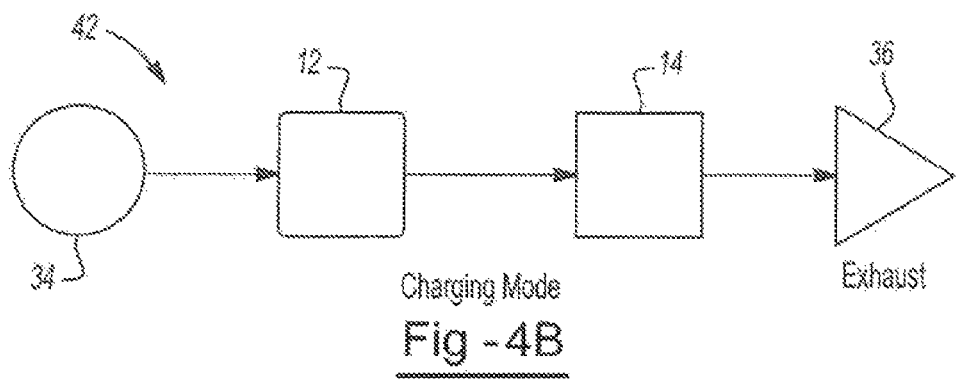
Figure 4C:
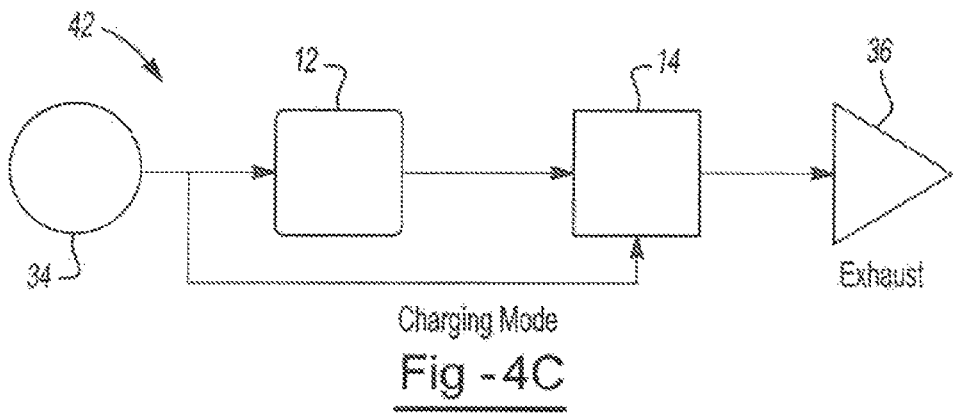

The emission reduction system may be capable of operating in a charging mode, such as the charging modes illustrated in FIGS. 4A, 4B, and 4C. The charging mode 42 may be characterized by a process including a step of flowing at least a portion of, or even all of the emission fluid from an emission source 34 through the emission reduction device 14 and through the heat storage device 12 prior to flowing through an exhaust point 36. For example, during the charging mode, the system may include a process including a step of flowing at least a portion, or even all of the emission fluid through the emission reduction device 14 prior to flowing through heat storage device 12, such as illustrated in FIG. 4A. Alternatively, during the charging mode, the system may include a process including a step of flowing at least a portion, or even all of the emission fluid through the heat storage device 12 prior to flowing through the emission reduction device 14, such as illustrated in FIG. 4B. While operating the system in, the charging mode, a portion of the emission fluid may by-pass the heat storage device 12, such as illustrated in FIG. 4C. It will be appreciated, that during the charging mode, a sufficient portion of the emission fluid flows through the heat storage device 12, so that the temperature of the TESM is increase, so that the TESM undergoes a solid to liquid phase transition, or both.

Figure 5A:
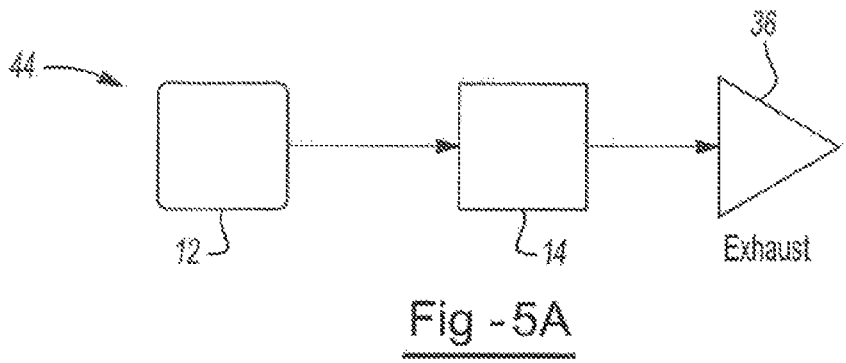
FIGS. 5A and 5B are flow diagrams illustrating features of a warm-up process mode for heating an emission reduction device 14 with heat stored in a heat storage device 12.
Figure 5B:
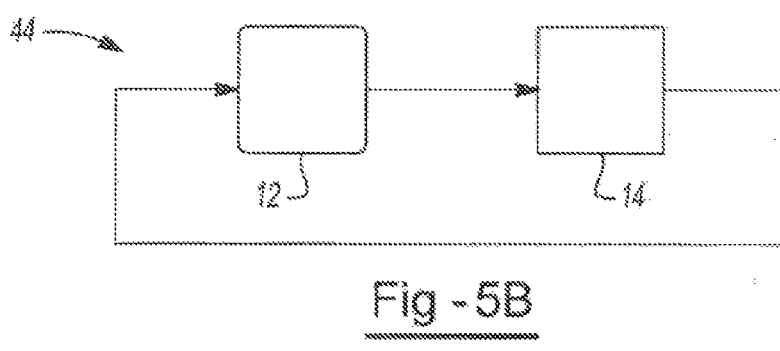

The emission reduction system may be capable in operating in a warm-up mode, such as the warm-up mode illustrated in FIGS. 5A and 5B. The warm-up mode may operate when the temperature of the heat storage device 12 is greater than the temperature of the emission fluid, greater than the temperature of the emission reduction device 14, or both. The warm-up mode may be employed when cold-starting an emission source, such as following a period during which the emission source been idled or turned off. The warm-up mode 44 may be characterized by a process including a step of flowing at least a portion of, or even all of the emission fluid from an emission source 34 through the heat storage device 12 prior to flowing through the emission reduction device 14, such as illustrated in FIG. 5A. While operating the system in the warm-up mode, preferably all of the emission fluid flows through the heat storage device 12 prior to flowing through the emission reduction device. The warm-up mode may operate as a loop, such as illustrated in FIG. 5B, where a fluid is circulated in a loop for transferring heat from the heat storage device to the emission reduction device. At a later time, a portion of the loop may be used for a charging mode.

The emission reduction system may include one or more valves arranged so that the system is capable of being operated in a first mode for flowing a fluid through the heat storage device 12 prior to flowing through the emission reduction device 14 and is capable of being operated in a second mode for flowing at least a portion of the fluid through the emission reduction device 14 and by-passing the heat storage device 12, such as the system illustrated in FIGS. 6A, 6B, 6C, and 6D. The heat storage device 12 and the emission reduction device 14 may be arranged in a generally serial arrangement.

Figure 6A:
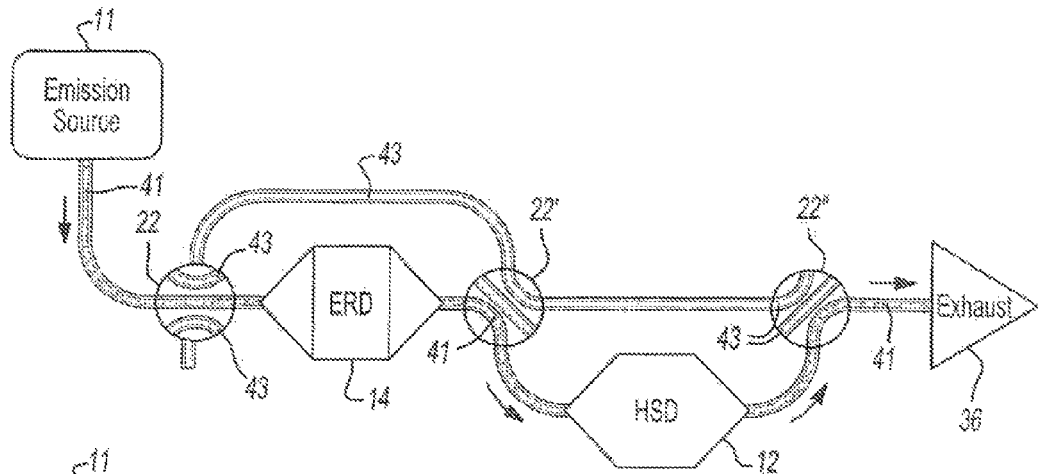
FIG. 6A is a drawing illustrating features of a charging process mode for operating a system including a heat storage device 12 and an emission reduction device having a generally serial arrangement.
Figure 6B:
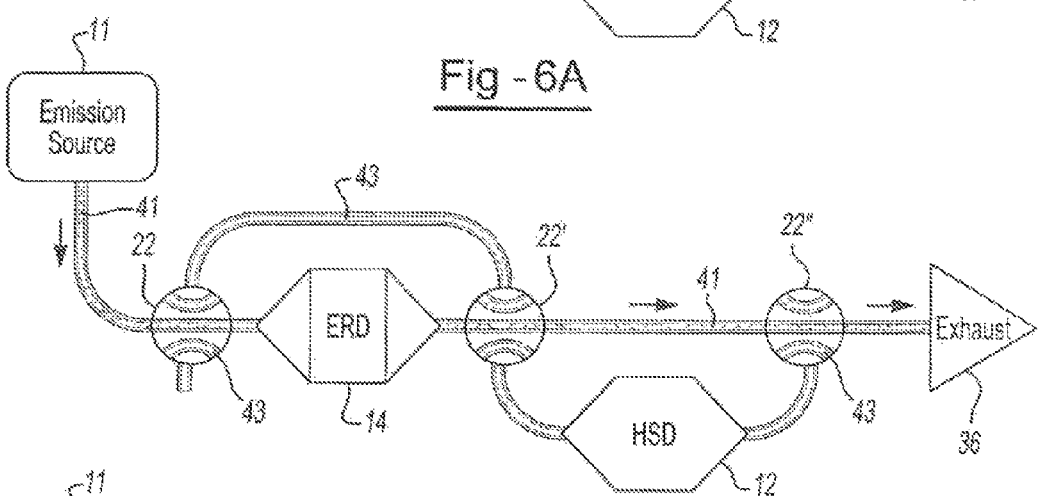
FIG. 6B is a drawing illustrating features of by-pass process mode for operating the system.
Figure 6C:
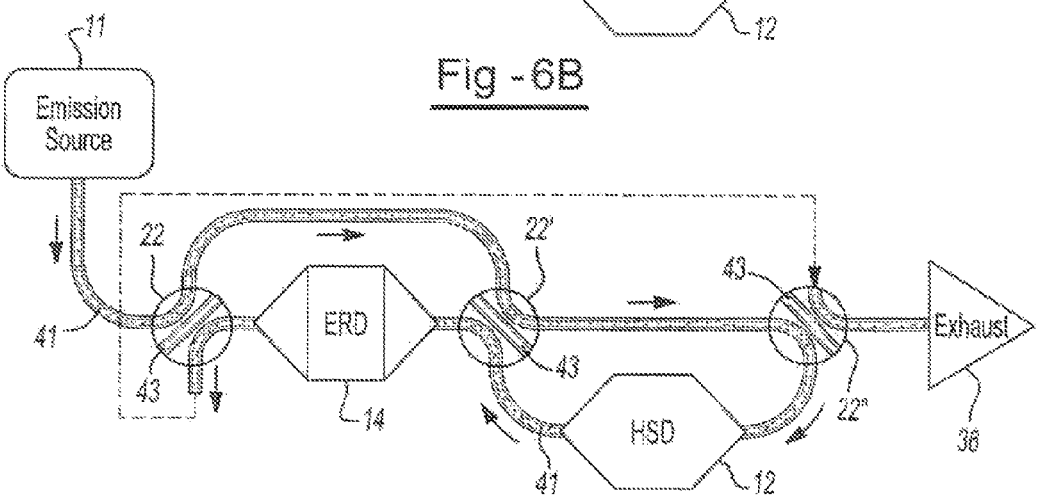
FIGS. 6C and 6D are drawings illustrating features of warm-up process modes for operating the system.
Figure 6D:
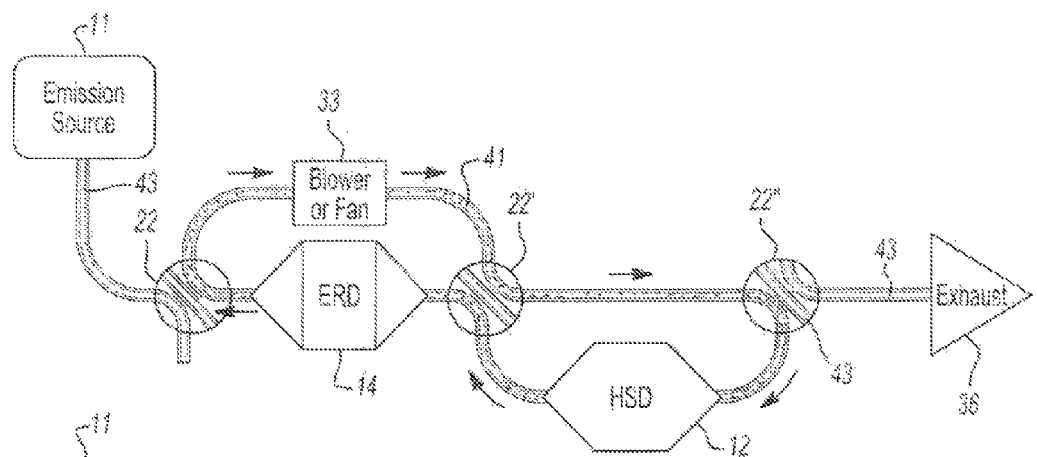

The system may include a sufficient number of valves so that the system is capable of operating in the different modes. For example, the system may include three or more valves, as illustrated in FIGS. 6A, 6B, 6C, and 6D. It will be appreciated that a valve, may be replaced with one or more additional valves to control the flow of a fluid. The system may be operated in a charging mode when an emission fluid has a temperature greater than the temperature of the heat storage device, such as illustrated in FIG. 6A. As illustrated in FIG. 6A, during the charging mode, the system may include a first set of components and/or portions of components 41 that are in fluid communication and have the fluid flowing through it. As illustrated in FIG. 6A, during the charging mode, the system may include a second set of components and/or portions of components, 43 without the fluid flowing through it. For example, the system may include a valve 22 having a first flow path including an entrance and an exit that is part of the first set 41 and one or more flow paths (e.g., each including an opening and an exit) that is part of the second set 43. During the various modes of operation, the first set of components and/or portions of components 41 employed in flowing the fluid may include more components and/or portions of components, the same components and/or portions of components (e.g., employed in different sequences), or fewer components and/or portions of components. The system may be operated in a by-pass mode (e.g., when the TESM in the heat storage device 12 is in a liquid state), such as illustrated in FIG. 6B. The system may be operated in a warm-up mode, so that thermal energy is transferred from the heat storage device to the emission reduction device, such as the warm-up modes illustrated in FIGS. 6C and 6D. The warm-up mode may use a fluid from the emission source (e.g., an emission fluid), such as illustrated in FIG. 6C. The system may include a fan or blower 33, as illustrated in FIG. 6D. For example, the warm-up mode may use the fan or blower 33 to circulate (e.g., in a closed-loop) a fluid between the heat storage device 12 and the emission reduction device 14, such as illustrated in FIG. 6D. The warm-up mode, such as the warm-up modes illustrated in FIGS. 6C and 6D, may be employed prior to starting an emission source. The warm-up mode, such as the warm-up mode illustrated in FIG. 6C, may be employed in a warm-up mode that includes the flow of an emission fluid.

Figure 7A:
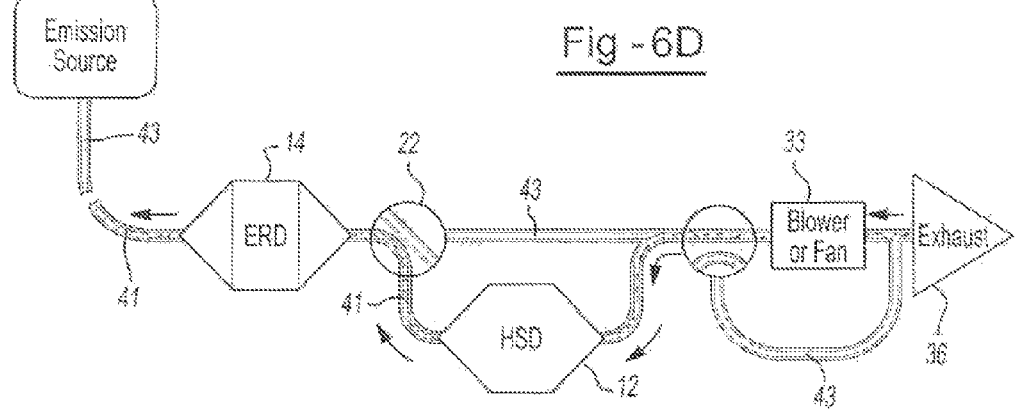
FIGS. 7A, 7B, and 7C are drawings illustrating features of modes for operating a system including a by-pass valve in a warm-up process mode, a charging process-mode, and a by-pass process mode, respectively.
Figure 7B:
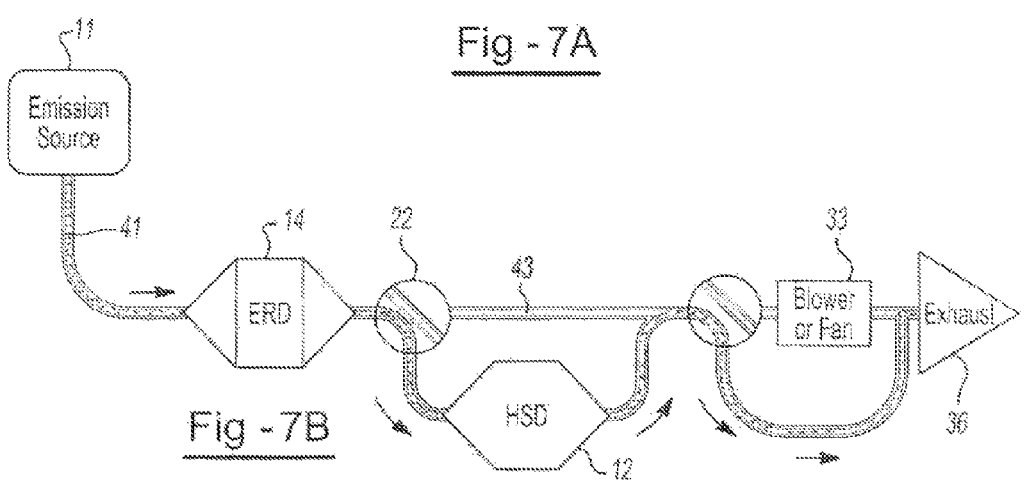
Figure 7C:
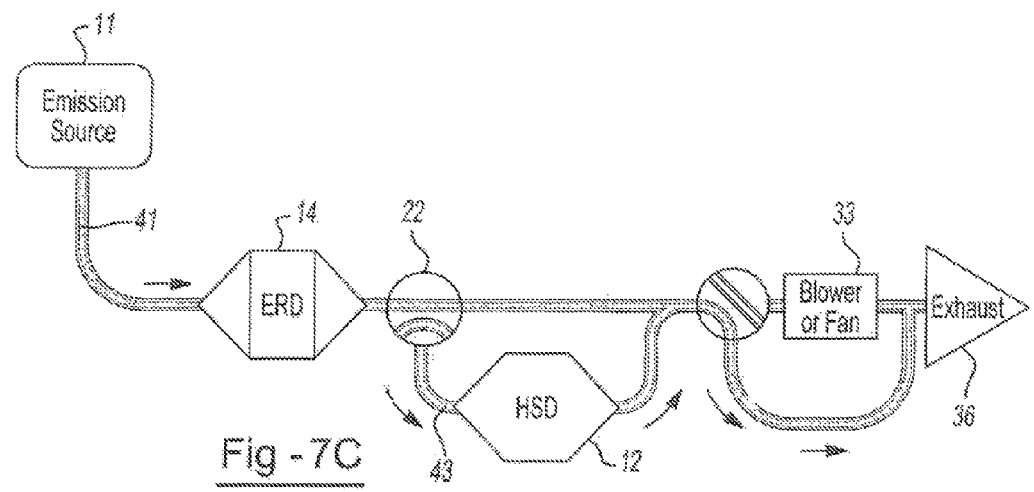

The emission reduction system may include an emission source, an emission reduction device, a heat storage device, one or more valves, an exit point, and a blower, fan, vacuum, or injector all in fluid communication, such as in the emission reduction system illustrated in FIGS. 7A, 78, and 7C. The emission reduction system may be capable of operating in a warm-up mode for transferring, heat from the heat storage device 12 to the emission reduction device 14, such as using the configuration illustrated in FIG. 7A. For example, the warm-up operating mode may be characterized by a blower, fan, vacuum, or injector 33 forcing a fluid to flow from an exit point (e.g., an opening to the environment) 36 through the heat storage device 12, and later through the emission reduction device 14. The emission reduction system may be capable of operating in a charging mode for transferring heat from an emission fluid to the heat storage device, 12, such as using the configuration illustrated in FIG. 7B. As illustrated in FIGS. 7A and 7B, the charging mode and the warm-up mode may use the same connectivity between the emission reduction device 14 and the heat storage device 12 and may differ in the direction of the flow of fluid between the two devices. The emission reduction system may be capable of operating in a by-pass mode, such as using the configuration illustrated in FIG. 7C. The system may be able to switch from a charging mode to a by-pass mode by changing the position of one or more valves, 22, such as by changing a by-pass valve 22 so that the emission fluid by-passes the heat storage device 12. The system may include one or more valves for controlling whether a fluid flows through or by-passes a blower, fan vacuum, or injector 33.

Figure 8A:
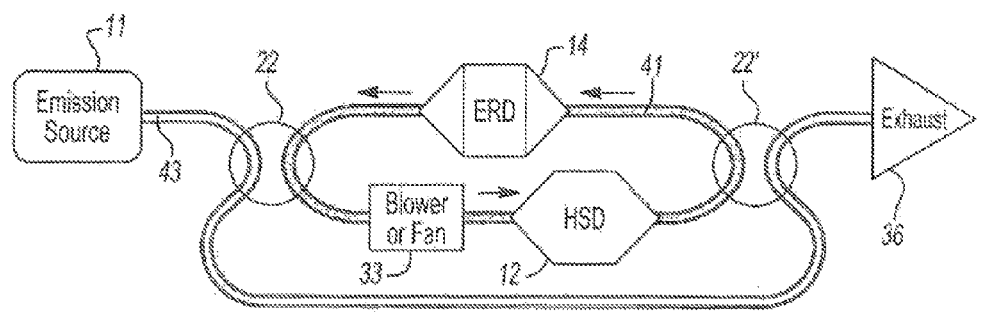
FIGS. 8A, 8B, 8C, 8D, and 8E are drawings illustrating features of a system including a heat storage device 12 and an emission reduction device 14 having a generally parallel arrangement.
Figure 8B:
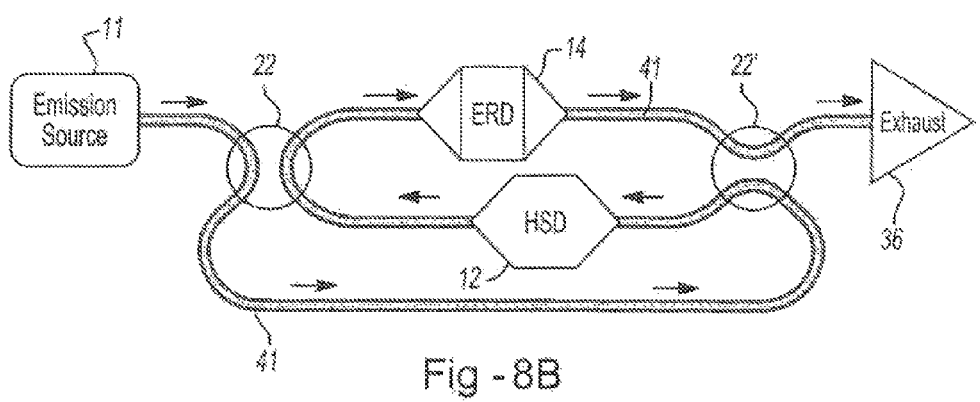
Figure 8C:
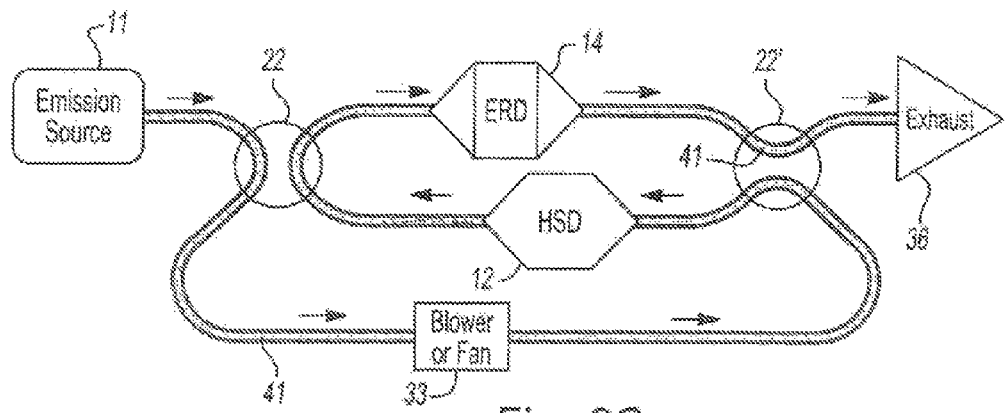
Figure 8D:
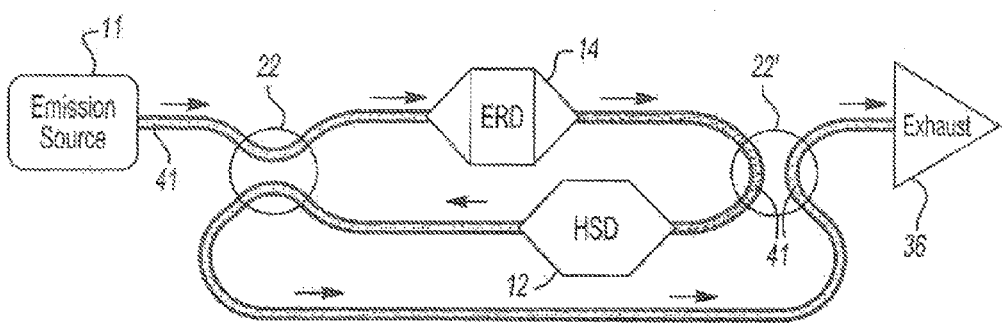
Figure 8E:
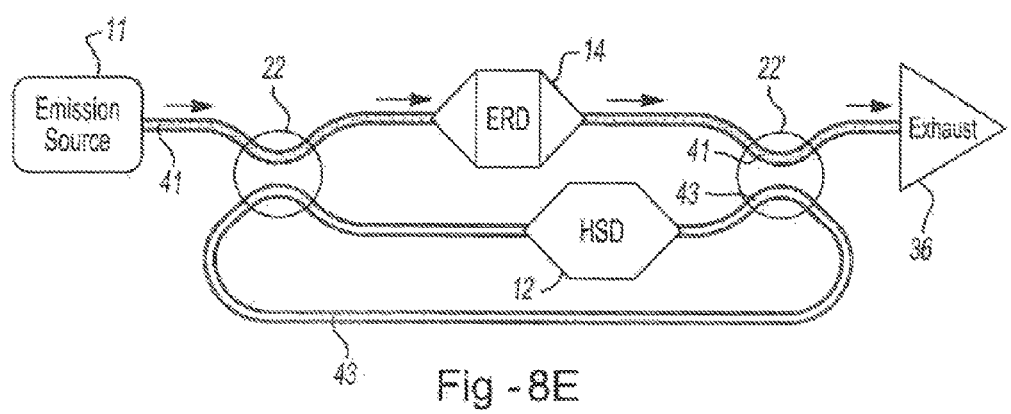

The emission reduction system may include one or more connections to an emission source, one or more heat storage device, one or more emission reduction systems, one or more exit points, and two or more valves, such as illustrated in FIGS. 8A, 8B, 8C, 8D, and 8E. The emission reduction system may be capable of operating in a warm-up mode for transferring heat from the heat storage device 12 to the emission reduction device 14, using a system that includes two or more valves 22, 22', such as illustrated in FIGS. 8A, 8B, and 8C. The warm-up mode may employ a blower, fan, vacuum, or injector 33 for circulating a fluid through a closed loop including the heat storage device 12 and the emission reduction device 14, such as illustrated in FIG. 8A. As such, the warm-up mode may be characterized by a blower, fan vacuum, or injector 33, a heat storage device 12 and an emission reduction device in fluid communication. The warm-up mode may be characterized by a closed loop including a blower, fan, or vacuum 33, a heat storage device 12 and an emission reduction device 14. The warm-up mode of operating the system may employ the emission fluid or another fluid provided by the connection to the emission source, as illustrated in FIG. 8B. For example, a fluid may flow through the heat storage device 12 and later through the emission reduction device 14 before flowing through the exit point 36, such as the flow illustrated in FIG. 8B. As another example, the system may employ a fan or blower 33, for flowing a fluid from the exit point 36, later to through the heat storage device 12, and later through the emission reduction device 14, such as illustrated in FIG. 8C. The system may be capable of operating in a charging mode, where an emission fluid flows through the emission reduction device 14 prior to flowing through the heat storage device 12, such as illustrated in FIG. 8D. Although a configuration where the emission fluid flows through the heat storage device 12 prior to flowing through the emission reduction device 14, such as illustrated in FIG. 8B, may be employed for the charging mode when the temperature of the emission fluid is greater than the temperature of the heat storage device, it may be advantageous to flow the emission fluid through the emission reduction device 14 prior to flowing through the heat storage device 12 so that the temperature of the emission fluid flowing through the emission reduction device is maximized. The system may be capable of operating in a by-pass mode, where at least a portion of the emission fluid by-passes the heat storage device 12, such as illustrated in FIG. 8E.

During the charging mode of operation where the emission fluid flows through the emission reduction device 14 prior to flowing through the heat storage device 12, it has surprisingly been found that the temperature of the emission fluid may increase while in the emission reduction device. As such, the temperature of the emission fluid entering the heat storage device 12 may be higher than the temperature of the emission fluid entering the system. For example, when flowing through the emission reduction device 14, the temperature of the emission fluid may increase by about 5° C. or more, about 10° C. or more, about 15° C. or more, or about 20° C. or more. Advantageously, the higher temperature of the emission fluid after flowing through the emission reduction device 12 may allow for the heat storage device to be heated faster, to store more heat, or both. Without being bound by theory, it is believed that one or more exothermic reactions, such as an oxidation reaction (e.g., an oxidation of carbon monoxide, a hydrocarbon, or both) may occur in the emission reduction device 12 resulting in the increase in temperature of the emission fluid.

The systems, devices and processes according to the teachings herein may advantageously be used for cold-starting an emission source. Cold-starting of an emission source occurs after a period of non-use such that the temperature of the emission source, the temperature of the emission reduction device, or both has decreased substantially compared to the temperature during continuous operation. For example, immediately prior to the cold-starting of the emission source, the temperature of the emission source, the emission reduction device, or both may below the lower limit operating temperature of the emission reduction device. The lower limit operating temperature of the emission reduction device may be the minimum temperature at which the emission reduction device is efficient in reducing the amount of the one or more undesirable chemicals. At the lower limit operating temperature, the emission reduction device may reduce the amount of an undesirable chemical by about 50% or more, preferably by about 80% or more, more preferably by about 90% or more, even more preferably by about 95% or more, and most preferably by about 99% or more. At the lower limit operating temperature, the emission reduction device may reduce substantially all, or even entirely all of the one or more undesirable chemicals.

The cold-starting of an emission source may occur when the temperature of an emission source, an emission reduction device, or preferably both is at or near ambient temperatures. By way of example, the cold-starting of an emission source may occur when the temperature of the emission source is about 50° C. or less, about 30° C. or less, about 0° C. or less, or about −20° C. or less.

When the emission source is a combustion engine of a vehicle, cold-starting may occur after the engine has been off for about 5 minutes or more, about 20 minutes or more, about 1 hour or more, or about 3 hours or more. It will be appreciated that the time for the emission source and/or the emission reduction device to cool (e.g., below the lower limit operating temperature of the emission reduction device) may depend on the ambient temperature, the thermal mass, the initial temperatures, and the rate at which the thermal energy is removed. The rate at which thermal energy is removed may depend on whether the vehicle is in motion (and its velocity). Cold-starting of an engine may occur after a vehicle has been parked, with the engine off. Cold-starting of an engine may occur while a vehicle is in motion, such as in a hybrid vehicle where the engine may operate intermittently, or in a range-extended electric vehicle where the engine may be turned on while the vehicle is being powered by its electric battery that is nearing charge depletion.

The emission reduction system preferably is capable of reducing the emission of carbon monoxide, such as during the first 30 seconds after cold starting an emission source. More preferably, the emission reduction system is capable of reducing the emissions of carbon monoxide discharged from the system during the first 30 seconds after cold starting an emission source by at least about 20% compared to a system without a heat storage device for heating the emission reduction device and only uses the heat directly from the emission source and carried by the emissions to heat the catalytic converter, wherein the cold starting occurs when the ambient temperature, the initial temperature of the emission source, and the initial temperature of the emission reduction device are all about 25° C.

Figure 9A:
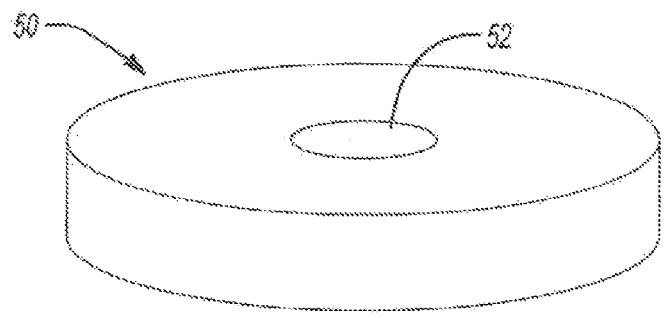
FIG. 9A is a drawing illustrating features of an article including a thermal energy storage material that may be employed in a heat storage device 12.
Figure 9B:
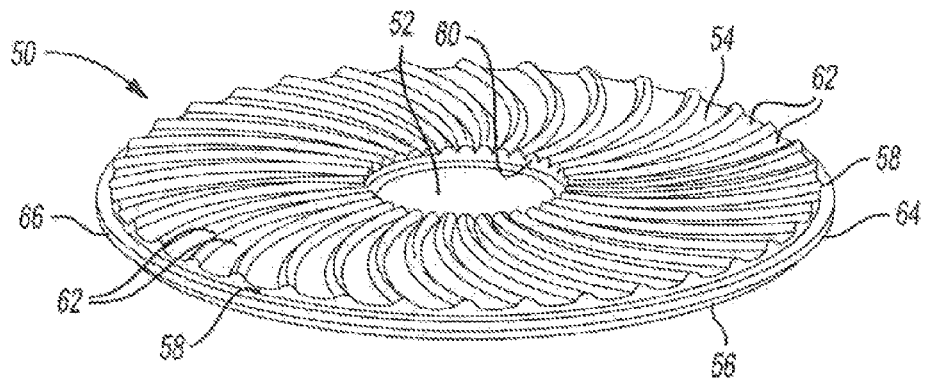
FIG. 9B is a drawing illustrating features of an article including a thermal energy storage material that may be employed in a heat storage device 12.

A preferred article 50 that may be employed in a heat storage device is an articles having one or more sealed spaces for storing TESM and a fluid passage 16 for flowing a fluid, such as the article illustrated in FIG. 9A. The article for containing a TESM may include a first sheet 54 and a second sheet 56, such as illustrated in FIG. 9B. The sheets 54, 56 may be sealingly attached about an outer periphery 58 and about an inner periphery 60 (e.g., the periphery of the article near the fluid passage 52). The first sheet 54, the second sheet 56, or both may include one or more grooves or channels 62, such so that a fluid may flow between the outer periphery 58 and the inner periphery 60. The article may have an outer edge 64. The article may include one or more sealed spaces 66 that contain a TESM.

Figure 10:
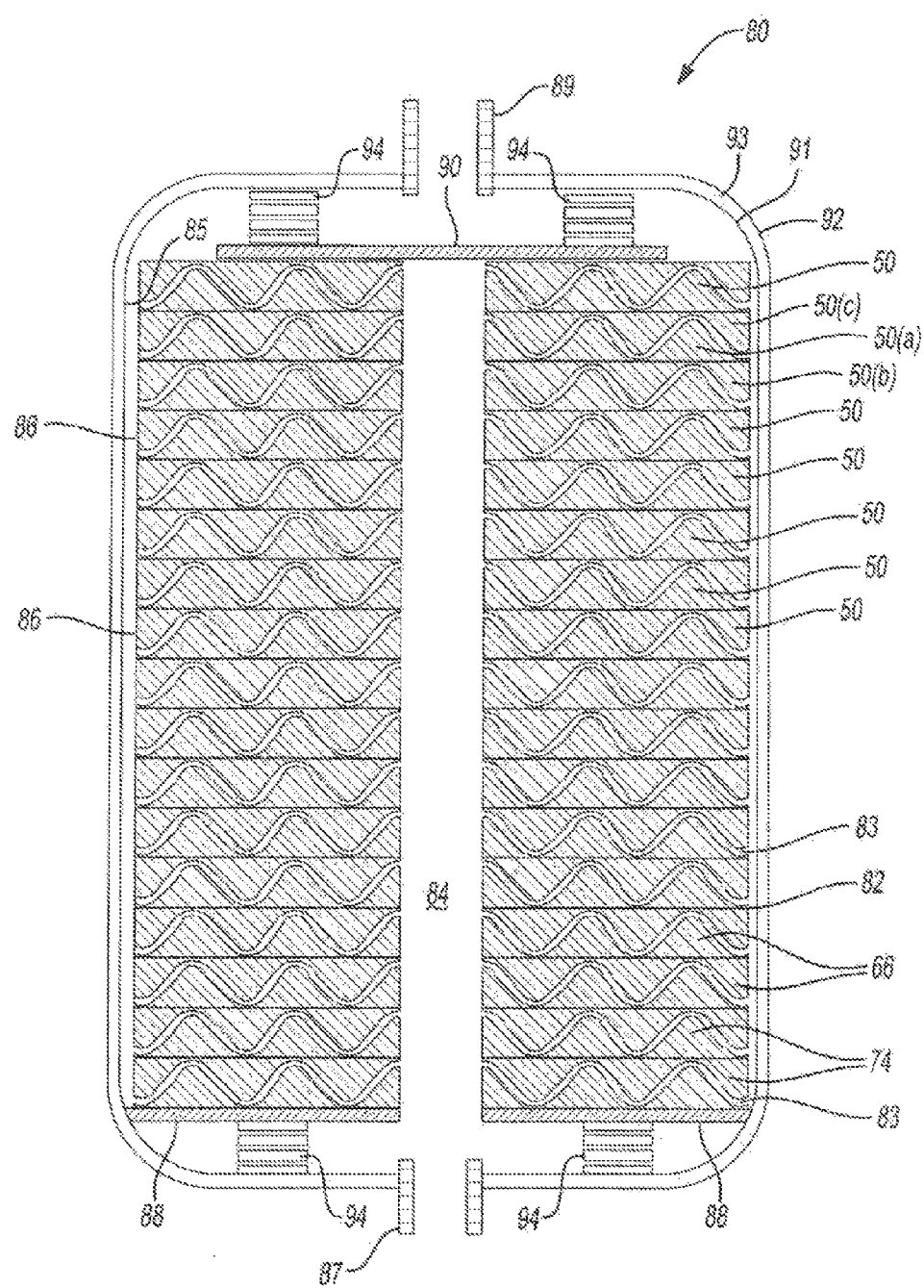
FIG. 10 is a drawing illustrating features of a heat storage device 12 that may be employed in an emission reduction system.

FIG. 10 illustrates features of a cross-section of an exemplary heat storage device 80 having a plurality of articles 50 each having thermal energy storage material 74 encapsulated in a plurality of sealed spaces 66. The articles may be arranged in an insulated container 82, such as a container having a generally cylindrical shape. The device may include an article 50(*a*) having a first adjacent article 50(*b*) and a second adjacent article 50(*c*). The article 50(*a*) and its first adjacent article 50(*b*) may be arranged with one surface generally in contact. The article 50(*a*) and the second adjacent article 50(*c*) may have generally mating surfaces and may be arranged so that they partially nest together. A spacer (not shown) may be used to maintain a distance between the article 50(*a*) and its second adjacent article 50(*b*) so that a heat transfer fluid (e.g., the emission fluid) can flow through a radial flow path 83 in a generally radial direction between the two articles, 50(*a*) and 50(*c*). The space between the article 50(*a*) and the second adjacent article 50(*c*) may be part of a passage for flowing a fluid, such as the emission fluid, through the heat storage device. As illustrated in FIG. 10, each article may have a surface that is in contact with a portion of the passage for flowing the fluid through the heat storage device so that the fluid can be in direct contact with each article and preferably each sealed space. As illustrated in FIG. 10, the flow through the heat storage device may include a radial flow path 83. Each radial flow path 83 may have the same length, the same cross-section, or even may be congruent. One or more of the articles may have an opening near its center. The openings through the articles may also be part of the fluid passage through the heat storage device. The articles 50 may be arranged so that their openings form a central axial flow path 84. The space between the outer periphery of the articles 50 and the interior surface of the container 85 may also be part of the fluid passage through the heat storage device and may form an outer axial flow path 86. The heat storage device may have a first orifice 87 that is in fluid connection with the central axial flow path 84. The heat storage device may have a first seal or plate 88 that separates the first orifice 87 from the outer axial flow path 86. The container 82 may have a second orifice 89 which may be on the same side of the container as the first orifice 87, or on a different side of the container, such as illustrated in FIG. 10. The heat storage device may have a second seal 90 that separates the second orifice 89 from the central axial flow path. The first seal, the second seal, or both may prevent a fluid from flowing between the two axial flow paths 84 and 86, without flowing through a radial flow path 83. With reference to FIG. 10, a fluid flowing between the first orifice 87 and the second orifice 89 must flow through a portion of the central axial flow path 84, and through a portion of the outer axial flow path 86. The heat transfer fluid must also flow through one of the radial flow paths 83 between flowing through the two axial flow paths 84, 86. The sizes of the two axial flow paths preferably are selected so that the hydraulic resistance of the fluid is generally constant regardless of which radial flow path a portion of the fluid takes. As such, the flow of the heat transfer fluid through the heat storage device is preferably a Tichelmann system. The container 82 preferably is insulated. For example, the container may have an inner wall 91 and an outer wall 92 and the space between the two walls 93 may be evacuated and/or filled with one or more insulating materials. The device may also have one or more springs, such as one or more compression springs 94, that exerts a compressive force on the stack of articles.

Furthermore, the present invention may be used in combination with additional elements/components/steps. For example the system may include a turbine to convert a part of the heat captured from the exhaust gas waste heat into useful mechanical or electrical work and thus improve the overall fuel efficiency of the vehicle.

It will be appreciated that the heat storage device may be further employed to heat one or more components in addition to the emission reduction device.

While the present invention may be susceptible to various modifications and alternative forms, the exemplary embodiments discussed above have been shown by way of example. However, it should again be understood that the invention is not intended to be limited to the particular embodiments disclosed herein. Indeed, the present techniques of the invention are to cover all modifications, equivalents, and alternatives falling within the spirit and scope of the invention as defined by the following appended claims.

What is claimed is:

1. A system for reducing the amount of one or more undesirable substances in a flow of a fluid from the discharge of an emission source, the system comprising:
   a. an emission reduction device capable of reducing a quantity of the undesirable substance, wherein the undesirable substance includes an undesirable chemical, an undesirable particle, or both;
   b. a heat storage device including a thermal energy storage material;
   c. one or more valves for controlling the flow of the fluid; and
   d. one or more exit points; wherein the system includes a sufficient number of valves, of said one or more valves, that are positioned with respect to the emission reduction device, the heat storage device and the one or more exit points so that the system is capable of operating in at least two modes including:
   i) a warm-up mode, wherein the emission reduction device, the heat storage device, and at least one of the one or more valves are in fluid communication with each other and at least some of the flow of the fluid passes through the heat storage device prior to passing through the emission reduction device, wherein thermal energy is removed from the heat storage device; and
   ii) a charging mode wherein the emission source, the emission reduction device, the heat storage device, at least one of the one or more exit points, and at least one of the one or more valves are in fluid communication with each other; and the heat storage device receives heat from the flow of the fluid from the discharge of the emission source, and at least some of the flow of the fluid passes through the emission reduction device and then said flow of fluid passes through the heat storage device, and then being discharged from the one or more exit points.

2. The system of claim 1, wherein the system includes a sufficient number of valves, of said one or more valves, that are positioned with respect to the emission reduction device, the heat storage device and the one or more exit points so that the system is capable of operating in at least three modes including a by-pass mode wherein the emission reduction device, at least one of the one or more exit points and at least one of the one or more valves are in fluid communication with each other, the flow of the fluid passes through at least the emission reduction device, the flow substantially by-passes the heat storage device, and the flow is discharged from the at least one of the one or more exit points.

3. The system of claim 1, wherein the undesirable substances includes one or more undesirable chemicals; and the heat storage device includes a catalyst capable of reducing the amount of the one or more undesirable chemicals.

4. The system of claim 2, wherein in the charging mode, the amount of the one or more undesirable substances in a portion of the flow of the fluid is first reduced in the emission reduction device and then passes through the heat storage device, and a different portion of the flow of the fluid passes through the emission reduction device without passing through the heat storage device.

5. The system of claim 2, wherein the thermal energy storage material of the heat storage device has a liquidus temperature from about 80° C. to about 350° C.

6. The system of claim 2, wherein the thermal energy storage material has a heat storage density of about 1 MJ/liter or more when heated from about 80° C. to about 350° C.

7. The system of claim 2, wherein
   i) the one or more valves includes a valve having multiple flow paths,
   ii) the valve having multiple flow paths that includes a diverter valve having at least a first inlet and at least two outlets, wherein the diverter valve is capable of decreasing the flow from one outlet of the diverter valve and increasing the flow from a second outlet of the diverter valve.

8. The system of claim 2, wherein the system includes a circulating device for circulating a fluid from the heat storage device to the emission reduction device during the warm-up mode.

9. The system of claim 2, wherein
   the emission source is an internal combustion engine;
   the emission reduction device is a catalytic converter of a vehicle;
   at least one of the one or more exit points is in fluid connection with a muffler;
   the flow of the fluid passes through the muffler after passing through the heat storage device during the charging mode; and
   the fluid is a vehicle exhaust.

10. The system of claim 9, wherein the system is capable of operating in the by-pass mode, and the flow of the fluid passes through the muffler after passing through the emission reduction device during the charging mode and during the by-pass mode.

11. The system of claim 1, wherein the heat storage device is sufficiently insulated so that it maintains a temperature of at least about 100° C. when the thermal energy storage material is heated to about 300° C. and then exposed to an ambient temperature of about 25° C. for about 24 hours.

12. The system of claim 2, wherein the system includes a sufficient amount of thermal energy storage material so that the system is capable of reducing the emissions of carbon monoxide discharged from the system during the first 30 seconds after cold starting an emission source by at least about 20% compared to a system without a heat storage device for heating the emission reduction device and only uses the heat directly from the emission source and carried by the emissions to heat the catalytic converter, wherein the cold starting occurs when the ambient temperature, the initial temperature of the emission source, and the initial temperature of the emission reduction device are all about 25° C.

13. The system of claim 2, wherein the undesirable substances includes one or more undesirable chemicals; and wherein the undesirable chemicals include one or more hydrocarbons, one or more nitrogen oxides, carbon monoxide, or any combination thereof; and the fluid is an exhaust gas generated by a process that includes burning of a hydrocarbon fuel.

14. The system of claim 1, wherein the thermal energy storage material is sealed in one or more capsules contained in the heat storage device.

15. A process comprising the steps of:
i) cold starting an emission source in fluid connection with the system of claim 2, to generate the fluid including the one or more undesirable chemicals; and
ii) passing at least a portion of the flow of the fluid through the heat storage device prior to passing the portion of the flow of the fluid through the emission reduction device during the cold starting operation wherein the temperature of the emission reduction device is below a predetermined minimum operating temperature.

16. The process of claim 15 wherein the process includes a step of changing one or more of the valves after the temperature of the emission reduction device reaches a predetermined minimum operating temperature so that the flow of the fluid passes through the emission reduction device prior to any flow of the fluid through the heat storage device.

17. The process of claim 16 wherein the process includes a step of increasing the temperature of the thermal energy storage material using heat from the fluid.

18. The process of claim 17, wherein the process comprises a step of changing one or more of the valves after the temperature of the thermal energy storage material of the heat storage device is raised above a predetermined maximum operating temperature so the amount of the flow that passes through the heat storage device is reduced or eliminated.

19. A process comprising the steps of:
i) passing the flow of a fluid with the system of claim 2 through the heat storage device and then through the emission reduction device using a fan or blower, so that the temperature of the emission reduction device is increased; and then
ii) cold starting an emission source in fluid connection with said system.

* * * * *